United States Patent [19]

Takahashi et al.

[11] Patent Number: 5,303,292
[45] Date of Patent: Apr. 12, 1994

[54] LOW PROFILE TELEPHONE SET

[75] Inventors: Yoshiya Takahashi; Katsumi Itoyama, both of Hino; Kouichiro Suda, Fuchu; Yoshio Fujinami, Hachioji, all of Japan

[73] Assignee: Kabushiki Kaisha Toshiba, Japan

[21] Appl. No.: 849,659

[22] Filed: Mar. 9, 1992

Related U.S. Application Data

[63] Continuation of Ser. No. 643,146, Jan. 18, 1991, abandoned, which is a continuation of Ser. No. 388,754, Aug. 3, 1989, abandoned, which is a continuation of Ser. No. 855,617, Apr. 25, 1986, abandoned.

[30] Foreign Application Priority Data

Apr. 26, 1985 [JP] Japan ................................. 60-90506

[51] Int. Cl.⁵ .................................................. H04M 1/00
[52] U.S. Cl. .................................. 379/454; 379/435; 379/436; 379/428
[58] Field of Search ............... 379/435, 436, 437, 438, 379/419, 428, 434, 441, 449, 454, 325, 326, 328, 53, 56, 60, 61; D14/142, 140

[56] References Cited

U.S. PATENT DOCUMENTS

| D. 256,233 | 8/1980 | Fukushima et al. | D14/53 |
|---|---|---|---|
| D. 259,419 | 6/1981 | Carter | D14/53 |
| D. 284,568 | 7/1986 | Yamagami et al. | D14/53 |
| D. 286,042 | 10/1986 | Fukutani | D14/53 |
| 3,840,711 | 10/1974 | Tucker | 379/454 |
| 3,851,119 | 11/1974 | Tucker | 379/454 |
| 3,859,476 | 1/1975 | Morrell et al. | 379/435 |
| 3,953,688 | 4/1976 | Rocha | 179/178 |
| 4,515,998 | 5/1985 | Pinede et al. | 179/100 C |
| 4,517,420 | 5/1985 | Haskins | 179/100 C |
| 4,741,033 | 4/1988 | Utoh et al. | 379/454 |

FOREIGN PATENT DOCUMENTS

| 2326283 | 12/1974 | Fed. Rep. of Germany | 379/435 |
|---|---|---|---|
| 1279105 | 10/1968 | German Democratic Rep. | 379/428 |
| 56-93463 | 7/1981 | Japan | 379/438 |
| 60-2699 | 1/1985 | Japan | 379/454 |
| 60-52148 | 3/1985 | Japan | 379/454 |
| 60-248054 | 12/1985 | Japan | 379/435 |
| 61-26352 | 2/1986 | Japan | 379/435 |
| 61-57155 | 3/1986 | Japan | 379/438 |

OTHER PUBLICATIONS

The Article "The Development of the Ambassador Range of Telephones and Productions of the Basic Instrument" by D. A. Pritchard and P. A. Burton, POEEJ, vol. 74, Jul. 1981, pp. 70–80.
"The Uniden Extend-A-Phone Line" catalog, 1983.

Primary Examiner—Jin F. Ng
Assistant Examiner—Jason Chan
Attorney, Agent, or Firm—Banner, Birch, McKie & Beckett

[57] ABSTRACT

A low profile telephone set which may be used as a table type model or as a wall mount-type model. The telephone set includes a casing and a holder. The casing is formed with a front bottom surface and a back bottom surface forming a predetermined angle there between. The holder is secured to the front bottom surface or back bottom surface in a designated direction depending on the manner of usage.

9 Claims, 4 Drawing Sheets

LOW PROFILE TELEPHONE SET

This application is a continuation of application Ser. No. 07/643,146, filed Jan. 18, 1991, now abandoned which is a continuation of application Ser. No. 07/388,754, filed Aug. 3, 1989, now abandoned which is a continuation of application Ser. No. 855,617, filed Apr. 25, 1986 now abandoned.

BACKGROUND OF THE INVENTION

This invention generally relates to the field of telecommunications and more particularly, is directed to a low profile telephone set which can be used as a wall mount-type or as a table top model.

Over the years, telephone sets have become one of the most popular and often necessary pieces of equipment in offices and homes. Modern telephone sets come in many different styles and usually include a number of features which are tailored to the user's needs. With respect to the outer structure of telephones, they can usually be divided into two categories, table top models and wall mount-type models.

In a table top model telephone, it is preferable for the convenience of the user that the front surface of the telephone be designed on an incline to improve the accessibility and operability of the telephone dialing apparatus. On the other hand, it is desirable that a wall mount-type telephone set be designed so that the top surface of the telephone is substantially parallel to the mounting surface and that the overall thickness is as thin as possible. However, the requirement of a manufacturer to produce two different types of telephone models, in addition to them being in a variety colors, is not cost effective. Thus, ideally a telephone set should be usable as a table model or as a wall mount-type model. Telephone sets which have this feature affords the user the maximum degrees of flexibility in the use of the telephone and also affords the manufacturer the benefit of a unitary design.

In a conventional telephone set which is designed for use as both a table model and as a wall mount-type model, a formed casing is usually provided which has top and bottom surfaces which are parallel to each other. A box-shaped holder is separately provided which has a lower side wall and an upper side wall. The holder is detachably secured to the bottom surface of the casing. FIGS. 1 and 2 illustrate a prior art telephone set in accordance with this construction.

As shown in FIG. 1 and FIG. 2, the telephone set includes handset 1, casing 2 composed of upper cover 2a and bottom cover 2b and holder 3. Casing 2 is formed with an upper surface 2c and a bottom surface 2d having planes which are parallel to each other. Holder 3 is formed in a box-shape and has a higher side wall 3a and lower side wall 3b. When the telephone is used as a table top model, holder 3 is fixed to bottom surface 2d of casing 2 in a relationship where higher side wall 3a corresponds to front portion 2e of casing 2 and lower side wall 3b corresponds to back portion 2f. Consequently, inclination angle $\theta$ is formed between the planes of top surface 2c of the casing and table top 6a. The user may more conveniently operate the telephone due to the presence of inclination angle $\theta$.

When the telephone is mounted on a wall, as shown in FIG. 2, holder 3 is fixed to casing 2 in the opposite direction to that shown in FIG. 1. As shown in FIG. 2, holder 3 is fixed to wall 6b by means of plate 6c. The height of the front portion 2e of the telephone set as measured from wall 6b is lower than the height of the back portion 2f. The manner in which the telephone set is secured to plate 6c and wall 6b is described in more detail in co-pending and commonly assigned U.S. patent application Ser. No. 709,762 filed Mar. 8, 1985.

Conventional telephone sets as shown in FIGS. 1 and 2 are deficient in that the height of the telephone set from the table top or wall is not sufficiently low. Low height has the virtues of stability and occupies less space. A lower profile telephone also requires less storage capacity which is also an important consideration for transportation. Because the cost of storage and transportation depends on the size of the telephone set, size accounts for a large percentage of overall cost.

The height of the telephone set is determined by the height of its highest internal component such as element 5 as shown in FIG. 3. Since the size of internal components cannot also be easily decreased, it is necessary to provide other ways of decreasing the overall height of the telephone set.

SUMMARY OF THE INVENTION

It is therefore, an object of the present invention to provide a low profile telephone set which can be used as a table top model or as a wall mount-type model.

It is another object of the present invention to provide a telephone set which is smaller in size and requires less space for storage and transportation than telephone sets known in the prior art.

It is a further object of the present invention to provide a low profile telephone set which can be used as a table top model or as a wall mount-type model wherein the back portion of the telephone set is lower in height when used as a table top model, and is wholly lower in height when used as a wall mount-type model.

According to the present invention, and in order to achieve the above objects, a telephone set is provided which includes a casing wherein the bottom surface of the casing is formed with a back bottom surface and a front bottom surface. The two bottom surfaces are formed with an angle between them. A holder which is fixedly detachable to at least the front bottom surface of the casing is also provided.

DETAILED DESCRIPTION OF THE EMBODIMENTS

Figure 6:
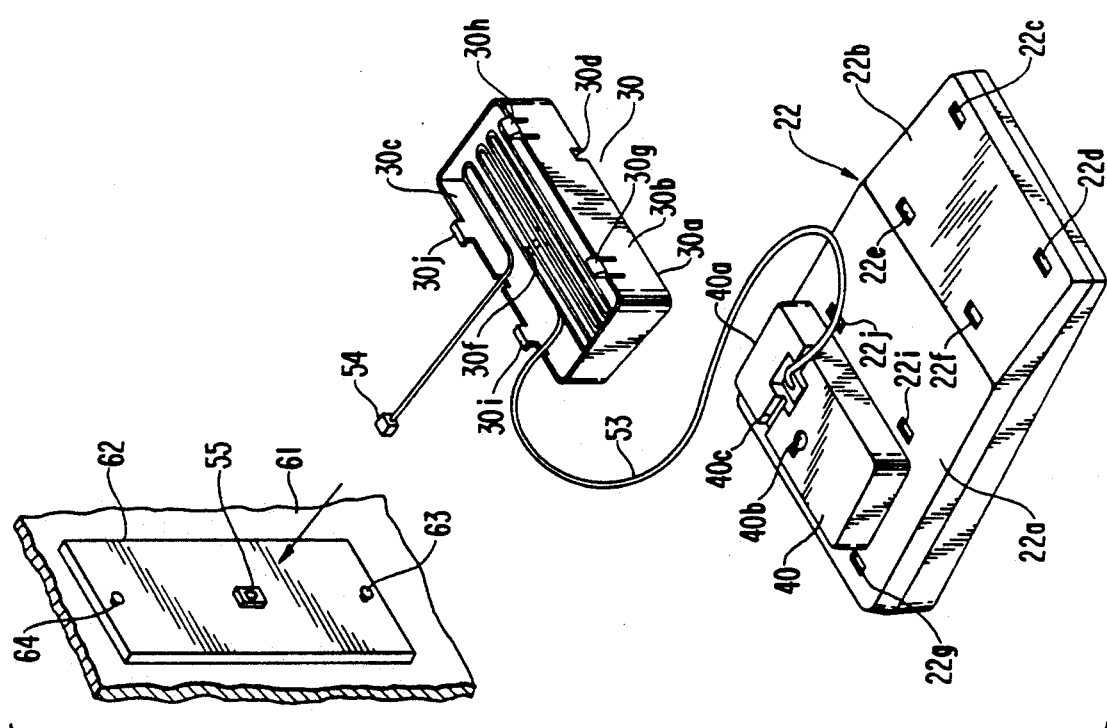
FIG. 6 is an assembly view of the essential components constituting the telephone set shown in FIG. 4.

A telephone set in accordance with the present invention is shown in FIGS. 4 to 7. The telephone set includes handset 10, casing 20 and holder 30. Handset 10 is fitted into a cradle (not shown) which is formed on the upper side of casing 20. Casing 20 is comprised of upper cover 21 and bottom cover 22 which are detachably fixed to each other and may be made of synthetic resin. Casing 20 has substantially rectangular surfaces similar to the prior art devices but has a cut-away back bottom portion which yields back bottom surface 22b and front bottom surface 22a which are inclined with respect to one another at an angle $\theta$. The length of back bottom surface 22b in the front to back direction is shorter than that of front bottom surface 22a. Back bottom surface 22b and upper surface 21a of casing 20, i.e., the upper surface of upper cover 21, is inclined with respect to each other by angle $\theta$ whereas front bottom surface 22a and upper surface 21a are parallel to each other. As shown in FIG. 6, engaging holes 22c, 22d, 22e and 22f are formed in the back bottom of bottom cover 22 as well as engaging holes 22g, 22i, 22j. Another engaging hole similar to holes 22g, 22i and 22j is also formed in bottom cover 22 but can not be seen in FIG. 6.

The telephone set further includes auxiliary case 40 and element 51 mounted on printed circuit board 52. In this example, element 51 has the highest profile of any of the elements within the interior of the telephone set and extends into casing 20. Element 51 also slightly extends through a hole (not shown) in bottom cover 22 across front bottom surface 22a. Casing 20 is formed to have a low profile. The elements with the largest height, i.e., element 51, are located in the front of the casing and partly project from the casing.

Outlet 40a, gutter-shaped passage 40b and key-shaped hole 40c are formed in the bottom of auxiliary case 40. Auxiliary case 40 covers the projecting part of element 51. Auxiliary case 40 is formed separately from casing 20 in this embodiment. It may, however, be formed together with bottom cover 22.

Figure 4:
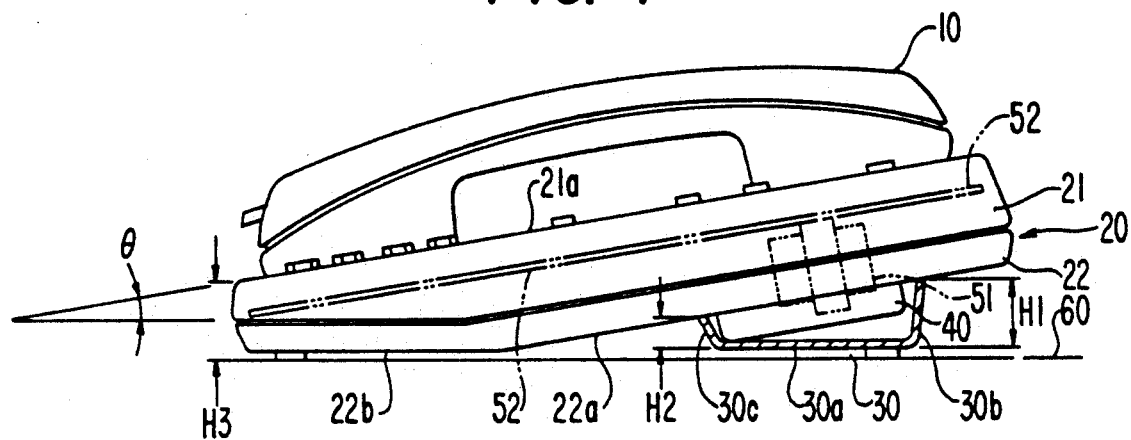
FIG. 4 is a partial section side view of a first embodiment of the invention.
Figure 5:
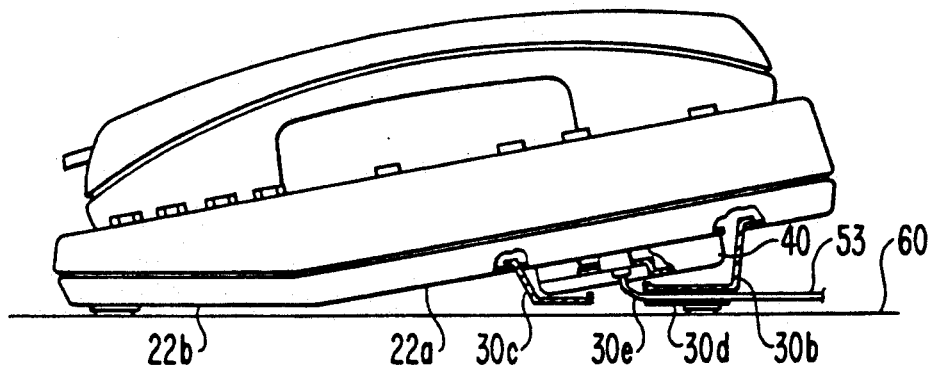
FIG. 5 is a side view of the telephone set shown in FIG. 4.

Holder 30 is formed in a box-shape, as best shown in FIG. 6, and is comprised of bottom 30a, higher side wall 30b, lower side wall 30c and two other side walls. The height of higher sidewall 30b and lower side wall 30c, which are measured in the perpendicular direction to bottom 30a of holder 30, are respectively H1 and H2 (FIG. 4). The distance between the top edges of higher side wall 30b and lower side wall 30c is shorter than the length of back bottom surface 22a of casing 20. Gutter-shaped passage 30d, an aperture 30e and key-shaped hole 30f are formed in bottom 30a of holder 30. Engaging pawls 30g and 30h are formed at the end portion of higher side wall 30b and engaging pawls 30i and 30j are formed at the end portion of lower side wall 30c. At the end portion of lower side wall 30c two opening are also formed.

Figure 1:
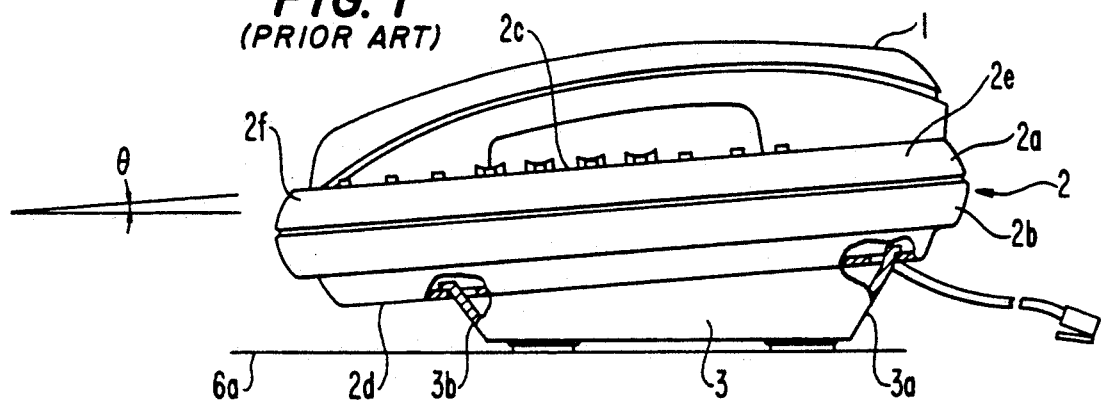
FIG. 1 is a partial section side view of a conventional telephone set which can be used as a table top model or as a wall mount-type model.
Figure 2:
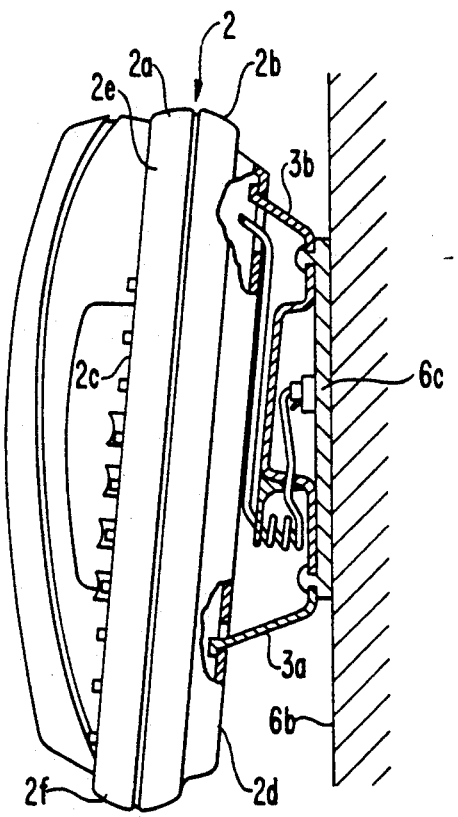
FIG. 2 is a partial section side view of the conventional telephone set illustrated in FIG. 1 shown mounted on a wall.
Figure 3:
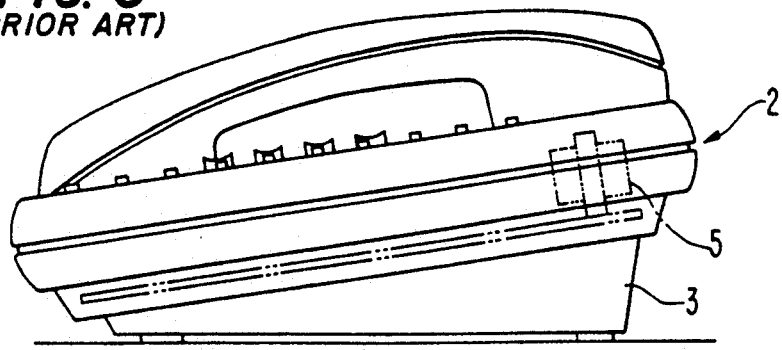
FIG. 3 is a side view of a conventional telephone set essentially of the same construction as the telephone set in FIG. 1 showing the relative height of one of its internal elements.

When the telephone set of the invention is used as a table top model, holder 30 is fixed to front bottom surface 22a of casing 20 by fitting engaging pawls 30i, 30j, and 30g into engaging holes 22i, 22j and 22g, respectively. As shown in FIGS. 1 and 2, holder 30 covers auxiliary case 40. Back bottom surface 22b and the bottom surface of holder 30 are in the same plane which is parallel to that of table surface 60. Thus, there is an inclination angle $\theta$ between the planes of table surface 60 and upper surface 21a of casing 20 which is required for the convenience of the user. Angle $\theta$ may be in the range of 40° to 60°. Height H3 at the rear end portion of casing 20 is relatively low. In other words, the rear end portion is very thin. It also looks better in external appearance and takes up less space. Telephone cord 53 is routed from inside of casing 20 through outlet 40a of auxiliary case 40 and aperture 30e of holder 30.

Figure 7:
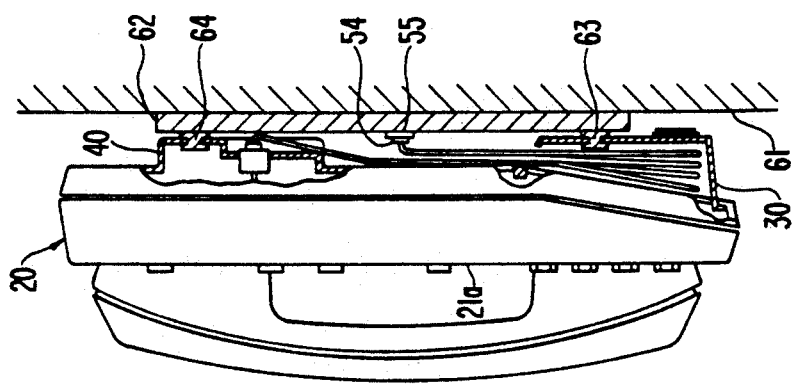
FIG. 7 is a partial section side view of the telephone set shown in FIG. 4 shown mounted to a wall.

Referring to FIG. 7, the telephone set of the present invention will be described when it is used as a wall mount-type. When used as a wall mount-type, holder 30 is secured to back bottom surface 22b of casing 20. Before securing, however, telephone cord 53 is positioned within holder 30. Holder 30 is then secured to back bottom surface 22b by fitting engaging pawls 30g, 30h, 30i and 30j into holes 22c, 22d, 22e and 22f, respectively. Modular plug 54 connected to one end of telephone cord 53 is plugged into modular jack 55 previously mounted to wall 61 by means of plate 62. Finally, key-shaped holes 30f and 40b on holder 30 and auxiliary case 40 are respectively engaged onto engaging pins 63 and 64 on plate 62, whereby holder 30 and auxiliary case 40 are fixedly mounted to the wall. In this way, the telephone set is mounted on the wall as can be seen in FIG. 7. When the telephone set is mounted on a wall, holder 30 is fixed not to front surface 22a but to back bottom surface 22b in the opposite direction. Accordingly, holder 30 in this case complements the cut-away portion of casing 20. The plane of upper surface 21a is almost parallel to that of wall 61. The height of upper surface 21a from the wall is relatively low compared to that of the conventional telephone shown in FIG. 2.

In this embodiment of the invention, the telephone set has a low profile regardless of whether it is used as a table top model or is mounted on a wall. Thus the telephone set of the present invention results in a decrease in storage and transportation cost.

Figure 8:
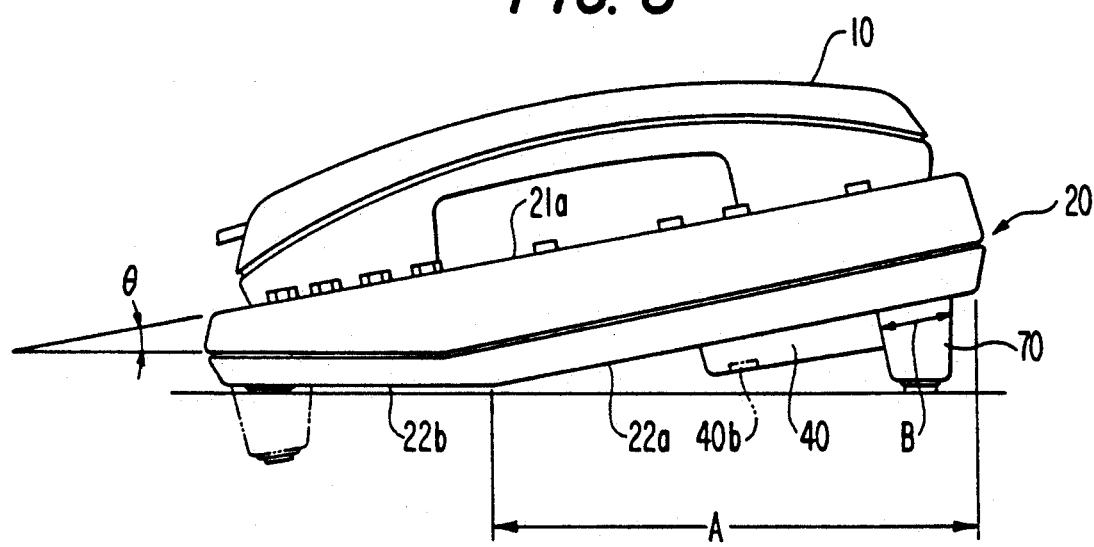
FIG. 8 is a side view of a further embodiment of the telephone set of the invention.
Figure 9:
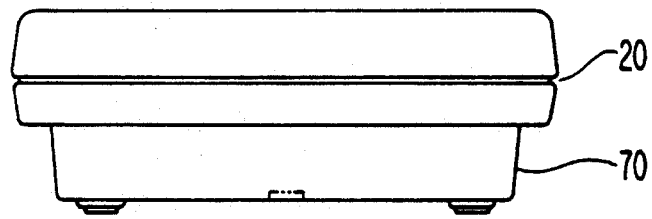
FIG. 9 is a front view of the telephone set shown in FIG. 8.

FIG. 8 and FIG. 9 show a second embodiment of the invention. In this embodiment, holder 70 is smaller in size than in the first embodiment. The length B of the holder 70 is slightly less than one fifth of the length A of front bottom surface 22a. The height of holder 70 is approximately equal to the length of front bottom surface 22a multiplied by the sine of the inclination angle $\theta$, and would actually be slightly less than this value. Auxiliary case 40 is also not covered by holder 70. Holder 70 is fixed to front bottom surface 22a in the far front position when the telephone set is used as a table top model. When the telephone set is used as a wall mount-type, holder 70 is fixed to back bottom surface 22b in the far back position as illustrated by phantom lines in FIG. 8. Key-shaped hole 40b of auxiliary case 40 is used for fixing the telephone set onto the wall and is shifted a little backward to maintain the relation distance to key-shaped hole 70f formed in the bottom of holder 70.

Figure 10:
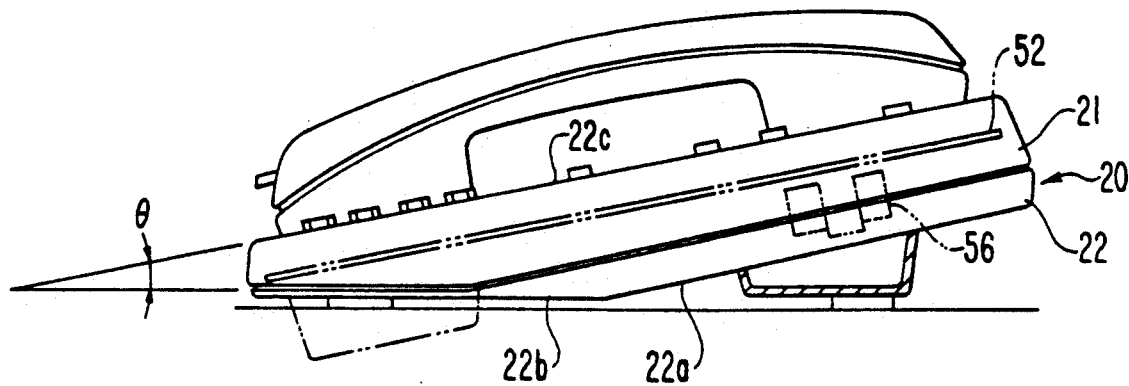
FIG. 10 is a partial section view of a further embodiment of the telephone set of the invention.

FIG. 10 shows the third embodiment of the invention. In this embodiment, the height of element 56 is low in comparison with the above embodiment. Thus the auxiliary case is removed because there is no need to cover elements 56. The back portion of casing 20 is also cut away on a larger scale. Therefore, the thickness of the telephone set is further reduced.

While in the foregoing specification, a few embodiments of the invention have been set forth for purposes of making a complete disclosure, it will be apparent to those skilled in the art that numerous changes may be made without departing from the spirit and principles of the invention.

We claim:

1. A telephone set for use as a table top model or a wall mount model, said telephone set comprising:
    a casing having a top portion and a bottom portion, said bottom portion comprising a back bottom surface and a front bottom surface at a pre-determined angle to said back bottom surface, said front bottom surface being substantially parallel to said top portion;
    a printed circuit board mounted within said casing with at least one electrical component;
    an auxiliary case projecting slightly from said front bottom surface, said auxiliary case permanently attached to said front bottom surface and completely covering said at least one electrical component; and
    a holder which is detachably fixed to said front bottom surface of said casing when said telephone set is used as a table top model and which is detachably fixed to said back bottom surface of said casing when said telephone set is used as a wall mount model.

2. A telephone set according to claim 1 wherein said holder is formed with first and second side walls, said second side wall being lower in height than said first side wall and wherein said holder is fixed to said front bottom surface such that said second side wall is closer to said back bottom surface than said first side wall when said telephone set is used as a table top model.

3. A telephone set according to claim 2 wherein said back bottom surface has a length shorter than that of said front bottom surface, and the distance between a top end of said first side wall and a top end of said second side wall is shorter than said length of said back bottom surface.

4. A telephone set according to claim 1 wherein said back bottom surface is substantially parallel to that of a table top when said telephone set is used as a table top model.

5. A telephone set according to claim 1 wherein the length of said holder is less than one fifth of the length of said front bottom surface, the height of said holder is approximately equal to the length of said front bottom surface multiplied by the sine of said predetermined angle, and said holder is attached to said bottom portion in close proximity to a front portion of said front bottom surface.

6. A telephone set according to claim 1 further comprising means in said auxiliary case for mounting said telephone set to a wall.

7. A telephone set for use as a table top model or a wall mount model, said telephone set comprising:
    a casing having a top portion and a bottom portion, said bottom portion comprising a front bottom portion and a cut-away back bottom portion;
    a printed circuit board mounted within said casing with electrical components;
    an auxiliary case projecting slightly from said bottom portion, said auxiliary case permanently attached to said front bottom portion and completely covering said electrical components;
    a holder detachably fixed to said front bottom portion when said telephone set is used as a table top model and detachably fixed to said cut-away back bottom when said telephone set is used as a wall mount model; and
    wherein a surface of said front bottom portion is substantially parallel to a surface of said top portion.

8. A telephone set according to claim 7 further comprising means in said auxiliary case for mounting said telephone set to a wall.

9. A telephone set for use as a table top model or a wall mount model, said telephone comprising:
    a casing having a top portion and a bottom portion, said bottom portion comprising a back bottom surface and a front bottom surface at a pre-determined angle to said back bottom surface, said front bottom surface being substantially parallel to said top portion;
    a printed circuit board mounted within said casing with at least one electrical component having a projecting portion which projects through said bottom portion of said casing;
    an auxiliary case projecting slightly from said front bottom surface, said auxiliary case permanently attached to said front bottom surface and completely covering the projecting portion of said at least one electrical component; and
    a holder which is detachably fixed to said front bottom surface of said casing when said telephone set is used as a table top model and which is detachably fixed to said back bottom surface of said casing when said telephone set is used as a wall mount model.

* * * * *